2,903,489
Patented Sept. 8, 1959

2,903,489

DECHLORINATION OF FLUOROCHLORO-ALKANES

John G. Abramo and Raymond H. Reinhard, Galveston, Tex., assignors to Monsanto Chemical Company, St. Louis, Mo., a corporation of Delaware No Drawing. Application November 23, 1956
Serial No. 623,797

5 Claims. (Cl. 260—653.5)

The present invention relates to an improved process for the dehalogenation of a halogen-containing compound. More particularly, it relates to the preparation of fluorochloro-olefins by dechlorination of fluorochloroalkanes.

The polymerization of fluoro-olefins yields many products which are useful in the fields of plastics and oils. A product of significant industrial importance, for example, is polytrifluorochloroethylene obtained by the polymerization of the monomer, trifluorochloroethylene. The monomer is in turn prepared by the dechlorination of trifluorotrichloroethane. Several techniques have been proposed for effecting the dehalogenation of fluorine-containing compounds such as trifluorotrichloroethane. One such technique employs a solvent such as methyl alcohol and a metal dehalogenating agent, for example, zinc. This method generally results in good yields with a minimum formation of by-products. However, one disadvantage of this process is the difficulty experienced in starting up the reaction. The dehalogenation is characterized by a substantial induction period. The time between the beginning of feed of material to be dehalogenated into the zinc-alcohol reaction medium and the initiation of the reaction has been observed to vary from 30 minutes to 3 hours depending upon the size of the particular operation involved. It has been necessary in the prior art, therefore, to add a promoter such as a metal halide, for example, to initiate the reaction. It has now been discovered that an extraneous material need not be added as a promoter and that substantial shortening or practical elimination of the reaction induction period can be effected by "activating" all or only a small amount of the zinc introduced as the dehalogenating agent by washing it with glacial acetic acid followed by washing with the alcoholic solvent used in the reaction prior to its introduction into the reactor. This technique also has the advantage of permitting the operation to be carried out at substantially atmospheric pressure, elevated pressures being required only in instances where some pressure may be needed to keep the starting material in the liquid phase during the reaction.

It is an object of the invention, therefore, to provide an improved method for the dehalogenation of fluorochloroalkanes.

It is another object of this invention to provide an improved dechlorination process for dechlorinating fluorochloroalkanes employing zinc as a dechlorinating agent along with a suitable solvent wherein the reaction induction period is substantially eliminated.

Other objects and advantages of the invention will become apparent to those skilled in the art from the accompanying description and disclosure.

According to the preferred method of practicing the invention, metallic zinc dust and an alcohol are charged to a suitable dechlorination reactor or vessel and thoroughly agitated. To this slurry there is added a small amount of "activated" zinc dust, i.e., zinc dust which has been subjected to a washing with glacial acetic acid followed by washing with the alcoholic solvent employed. The fluorochloroalkane to be dehalogenated is then fed to the reactor while the liquid phase in the vessel is continuously agitated by means of a stirrer. The gaseous product is removed as it is made, condensed, and passed to suitable distillation equipment for the removal of entrained solvent or unreacted fluorochloroalkane feed.

The following example is presented to illustrate the invention but is not to be construed as limiting it in any manner except as it is limited in the appended claims.

*Example*

The reactor employed was a one-liter, three-necked flask fitted with a stirrer, a dropping funnel, and a reflux condenser with a take-off tube attached in such a way that gas from the top of the condenser went through a bubbler to a Dry Ice-acetone trap where the product was collected. A water-methanol solution at a temperature of —10° C. was circulated through the reflux condenser. About 70 g. of zinc dust in 300 ml. of absolute methanol was charged to the flask. A 10-gram portion of zinc dust was washed twice with glacial acetic acid and three times with methanol. The zinc was charged to a flask, glacial acetic acid was poured in until the zinc dust was thoroughly submerged in it, and the flask was swirled for a period of time to effect contact and washing of the metal with the acid. After the zinc was allowed to settle, the acid was decanted and a second washing was effected in the same manner. Again the acid was decanted and the washing operation was then repeated three times using fresh quantities of methanol each time as the wash liquid. After decanting of the last of the methanol wash liquid, the treated zinc was added to the zinc-methanol slurry in the reactor. 1,1,2-trifluoro-1,2,2-trichloroethane was then gradually introduced into the flask via the dropping funnel. A reaction occurred immediately as evidenced by the passage of gas through the bubbler connected to the top of the condenser. The total trifluorotrichloroethane charge (190 g.) was added gradually over a two-hour period. The solution in the flask became warm and its temperature eventually rose to the boiling point of methanol. Product gas was condensed in the cold trap and then distilled therefrom through a calcium chloride drying tube into another trap for removal of traces of methanol and unreacted feed material. A quantity of trifluorochloroethylene representing a good yield was recovered. An attempt to carry out the same reaction in the same manner in the absence of any zinc that had been treated in the manner described above was totally unsuccessful.

Variation in conditions, quantities of reactants, and procedure may be made from those given in the example without departing from the scope of the invention. While, for example, the zinc-alcohol slurry containing the activated zinc is preferably charged to the reactor prior to the material to be dehalogenated, it may also be added simultaneously with or subsequent to the latter.

The amount of zinc dehalogenating agent introduced into the dehalogenator is at least that amount necessary for the removal of two chlorine atoms from the fluorochloroalkane. Preferably, an excess of the dehalogenating agent is employed with excesses up to 10% being used. All of the zinc dehalogenating agent may be "activated" by washing with glacial acetic acid and the alcohol solvent used but this is not necessary. Satisfactory initiation of the reaction is achieved when from about 15 to about 20% by weight of the total zinc employed is pretreated or activated by washing with glacial acetic acid.

Suitable solvents in addition to the preferred methanol include other alkyl alcohols such as ethyl, n-propyl, n-butyl alcohols and the like. The amount of solvent employed depends upon reaction conditions. Generally, an amount of solvent equivalent in weight to the fluorochloroalkane is used but more or less may be satisfactory in specific instances.

The use of the activated zinc of the invention makes it possible to conduct the dehalogenation at substantially atmospheric pressure and at low temperatures. In the dechlorination of trifluorotrichloroethane to the corresponding unsaturated trifluorochloroethylene, the reaction is readily initiated at ambient or room temperature and the temperature is thereafter readily maintained at the reflux temperature of the solvent medium by the exothermic heat of reaction without any external heating or cooling being required. Suitable temperatures generally lie in the range from about 0° C. to 200° C. depending upon the solvent employed. Preferred temperatures are those in the range from about 50° C. to about 110° C. The use of pressure is required only when it is necessary to maintain the fluorochloroalkane in the liquid phase in the reactor. However, the reaction may be carried out in an autoclave under pressure if desired and this type of operation may offer some advantages with regard to recovery of product.

The process of the invention may be operated either in a batch or continuous manner and is applicable in the dechlorination of a large number of fluorochloroalkanes to the corresponding fluorochloro-olefins. Among those which may be mentioned are difluorodichloroethane, trifluorodichloroethane, trichlorodifluoroethane, tetrachlorotrifluoropropane, difluorotrichloropropane, tetrafluorotrichloropropane, dichlorodifluoropropane, trichlorotrifluorobutane, difluorodichlorobutane and the like. It is equally applicable in the dechlorination of any vicinal dichlorinated compounds even though they do not contain fluorine. For example, trichloroethane may be dehalogenated to vinyl chloride, using the process of the invention.

What is claimed is:

1. In a process for dechlorinating a fluorochloroalkane with metallic zinc and an alcohol in a dechlorination zone to produce the corresponding fluorochloro-olefin, the improvement which comprises employing in said dechlorination zone zinc which has been activated by separate washings with glacial acetic acid and then said alcohol.

2. In a process for dechlorinating a fluorochloroethane with metallic zinc and an alcohol in a dechlorination zone to produce a fluorochloroethylene, the improvement which comprises employing in said dechlorination zone zinc which has been activated by separate washings with glacial acetic acid and then said alcohol.

3. In a process for dechlorinating a fluorochloroethane with metallic zinc and an alcohol in a dechlorination zone, the improvement which comprises employing in said dechlorinating zone a mixture of metallic zinc and zinc which has been activated by separate washings with glacial acetic acid and then said alcohol, said activated zinc being present in an amount equal to at least about 15% by weight of said metallic zinc.

4. In a process for dechlorinating 1,1,2-trifluoro-1,2,2-trichloroethane with metallic zinc and methanol in a dechlorination zone to produce trifluorochloroethylene, the improvement which comprises employing in said dechlorination zone zinc which has been activated by separate washings with glacial acetic acid and then said methanol.

5. In a process for dechlorinating 1,1,2-trifluoro-1,2,2-trichloroethane with metallic zince and methanol in a dechlorination zone to produce trifluorochloroethylene, the improvement which comprises employing in said dechlorinating zone, a mixture of metallic zinc and a zinc which has been activated by separate washings with glacial acetic acid and then said methanol, said activated zinc being present in an amount equal to at least about 15% by weight of said metallic zinc.

References Cited in the file of this patent

UNITED STATES PATENTS

| | | |
|---|---|---|
| 2,590,433 | Blum | Mar. 25, 1952 |
| 2,635,121 | Smith et al. | Apr. 14, 1953 |